(12) United States Patent
Lee et al.

(10) Patent No.: US 9,744,426 B2
(45) Date of Patent: Aug. 29, 2017

(54) ELECTRONIC DEVICE AND METHOD FOR CONTROLLING THE ELECTRONIC DEVICE

(71) Applicant: HON HAI PRECISION INDUSTRY CO., LTD., New Taipei (TW)

(72) Inventors: Hou-Hsien Lee, New Taipei (TW); Chang-Jung Lee, New Taipei (TW); Chih-Ping Lo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 147 days.

(21) Appl. No.: 14/752,497

(22) Filed: Jun. 26, 2015

(65) Prior Publication Data
US 2016/0375339 A1    Dec. 29, 2016

(51) Int. Cl.
*A63B 24/00*    (2006.01)
*A63B 71/00*    (2006.01)
*G06K 9/00*    (2006.01)
*G06K 9/46*    (2006.01)
*A63B 22/02*    (2006.01)
*H04N 5/77*    (2006.01)
*A63B 71/06*    (2006.01)
*A63B 22/06*    (2006.01)
*G01S 17/88*    (2006.01)

(52) U.S. Cl.
CPC ........ *A63B 71/0054* (2013.01); *A63B 22/025* (2015.10); *A63B 24/0087* (2013.01); *G06K 9/00362* (2013.01); *G06K 9/46* (2013.01); *H04N 5/772* (2013.01); *A63B 22/0605* (2013.01); *A63B 71/0622* (2013.01); *A63B 2024/0093* (2013.01); *A63B 2071/0072* (2013.01); *A63B 2071/0081* (2013.01); *A63B 2071/065* (2013.01); *A63B 2071/0677* (2013.01); *A63B 2220/05* (2013.01); *A63B 2220/13* (2013.01); *A63B 2220/22* (2013.01); *A63B 2220/31* (2013.01); *A63B 2220/806* (2013.01); *A63B 2220/833* (2013.01); *G01S 17/88* (2013.01)

(58) Field of Classification Search
CPC . A63B 24/00; A63B 24/0062; A63B 24/0087; A63B 71/0054; A63B 71/0622; A63B 2071/0072; A63B 2071/0081; A63B 2220/05; A63B 2220/13; A63B 2220/22; A63B 2220/31; A63B 2220/806; A63B 2220/833
USPC ............................................ 482/1–9, 51, 54
See application file for complete search history.

(56) References Cited

U.S. PATENT DOCUMENTS

| | | | | |
|---|---|---|---|---|
| 9,292,083 B2* | 3/2016 | Evertt | ..................... | G06F 3/011 |
| 2008/0191864 A1* | 8/2008 | Wolfson | .................. | G06F 3/011 340/524 |
| 2011/0009241 A1* | 1/2011 | Lane | .................. | A63B 24/0087 482/8 |
| 2011/0034300 A1* | 2/2011 | Hall | ........................ | A63B 5/11 482/1 |

(Continued)

*Primary Examiner* — Glenn Richman
(74) *Attorney, Agent, or Firm* — Steven Reiss (57) ABSTRACT

A method for adjusting a working state of an electronic device includes setting a reasonable value range of feature data of a user, and acquiring current feature data of the user from the camera device. The current feature data is compared to the reasonable value range of feature data. A working state of the electronic device is changed when the current feature data is out of the reasonable value range of feature data.

4 Claims, 7 Drawing Sheets

(56) References Cited

U.S. PATENT DOCUMENTS

| | | | |
|---|---|---|---|
| 2013/0190135 A1* | 7/2013 | Pryor | B60K 35/00 482/8 |
| 2014/0274567 A1* | 9/2014 | McCready | A63B 71/0622 482/8 |
| 2016/0066835 A1* | 3/2016 | He | A61B 5/6898 482/4 |

* cited by examiner

ELECTRONIC DEVICE AND METHOD FOR CONTROLLING THE ELECTRONIC DEVICE

FIELD

The subject matter herein generally relates to electrical device control technology, and particularly to an electronic device and a method for controlling a working state of the electronic device.

BACKGROUND

An electronic device (e.g., a treadmill) can be used for exercising. However, when the electronic device is used wrong, a user of the electronic device may get hurt.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY™, flash memory, and hard disk drives. The term "comprising" means "including, but not necessarily limited to"; it specifically indicates open-ended inclusion or membership in a so-described combination, group, series and the like.

Figure 1:
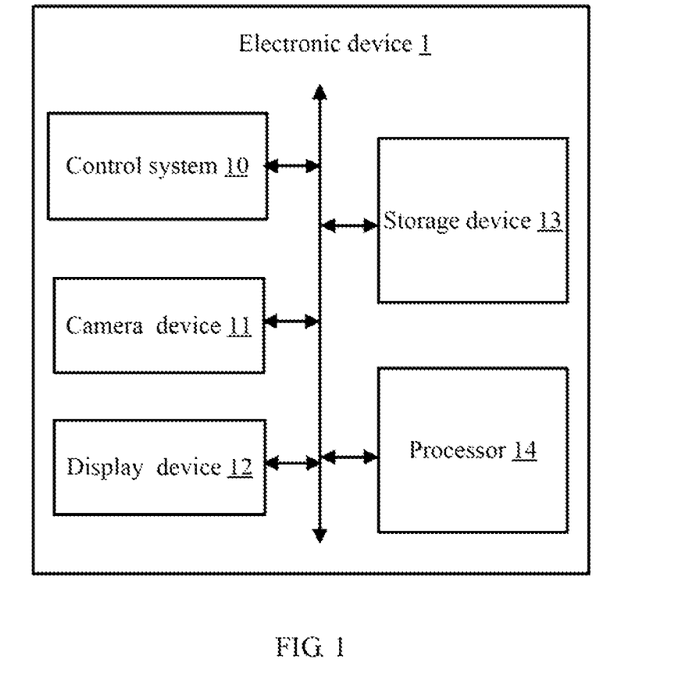
FIG. 1 is a block diagram of an example embodiment of an electronic device.

FIG. 1 is a block diagram of an example embodiment of an electronic device. In at least one embodiment as shown in FIG. 1, an electronic device 1 includes a control system 10. The electronic device 1 can be a treadmill, a stationary bike, or any other exercise equipment. The electronic device 1 further includes, but is not limited to, a camera device 11, a display device 12, a storage device 13, and at least one processor 14. FIG. 1 illustrates only one example of the electronic device, other examples can include more or fewer components than illustrated, or have a different configuration of the various components in other embodiments.

Figure 2:
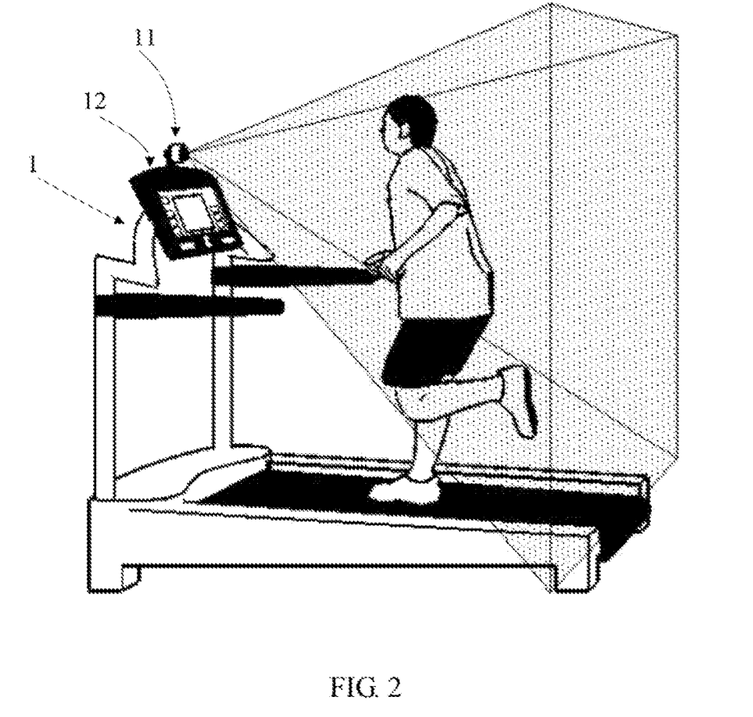
FIG. 2 is a diagrammatic view of an example embodiment of a position of a camera device.

In at least one embodiment, the camera device 11 can be a time-of-flight camera (TOF camera). The TOF camera is a camera system that creates distance data with help of the time-of-flight principle. The scene is illuminated by short light pluses and the camera measures the time taken until the reflected light reflects back to the camera. The time is directly proportional to the distance. The camera therefore provides a range value for each pixel. The time-of-flight principle is similar to that of 3D scanners with the advantage that whole scene is captured at the same time. As shown in FIG. 2, the camera device 11 can be positioned in front of a user, and can record a video of the user.

In at least one embodiment, the storage device 13 can include various types of non-transitory computer-readable storage mediums. For example, the storage device 14 can be an internal storage system, such as a flash memory, a random access memory (RAM) for temporary storage of information, and/or a read-only memory (ROM) for permanent storage of information. The storage device 13 can also be an external storage system, such as a hard disk, a storage card, or a data storage medium.

In at least one embodiment, the at least one processor 14 can be a central processing unit (CPU), a microprocessor, or other data processor chip that performs functions of the electronic device 1. The processor 14 can control a working state of the electronic device 1, for example, reducing an execution speed of the electronic device 1.

The control system 10 can change a working state of the electronic device 1 by analyzing feature data of a user of the electronic device 1. When current feature data acquired by the control system 10 is out of a reasonable value range of the feature data, the electronic device 1 can be stopped.

Figure 3:
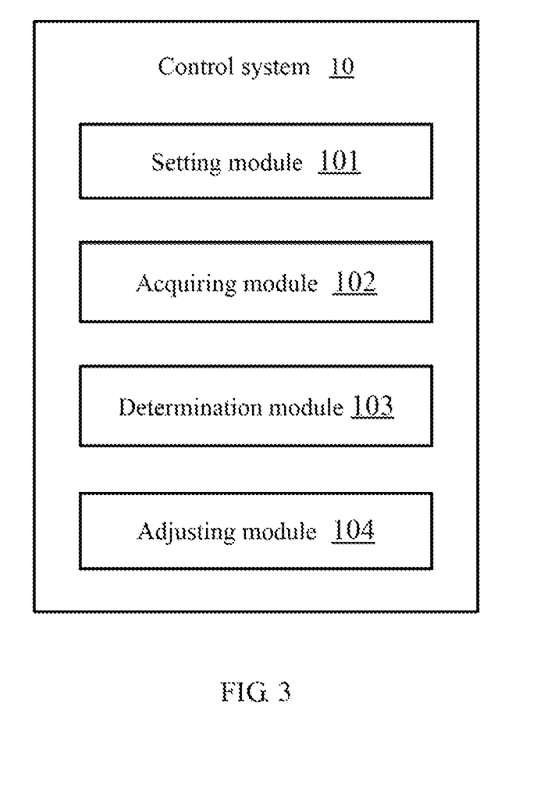
FIG. 3 is a block diagram of an example embodiment of function modules of a control system.

FIG. 3 is a block diagram of one embodiment of function modules of the control system. In at least one embodiment, the control system 10 can include a setting module 101, an acquiring module 102, a determination module 103, and an adjusting module 104. The function modules 101, 102, 103, and 104 can include computerized codes in the form of one or more programs which are stored in the storage device 13. The at least one processor 14 executes the computerized codes to provide functions of the function modules 101-104.

Figure 4:
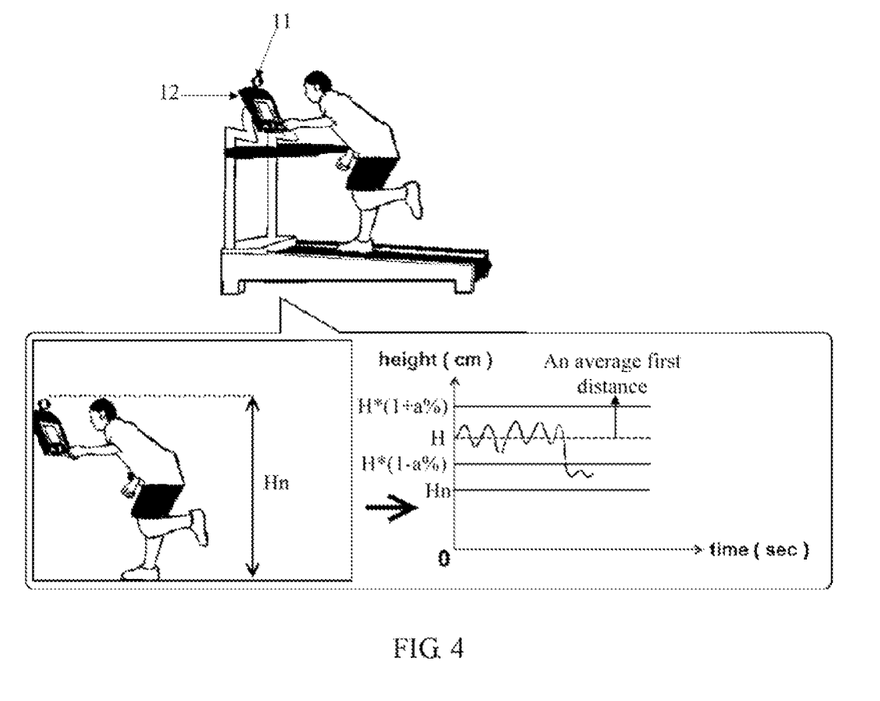
FIG. 4 is a diagrammatic view of an example embodiment of a first distance of feature data of a user.

The setting module 101 can set a reasonable value range of feature data of the user. In at least one embodiment, the feature data includes pixel values of pixel points of an image of the user, a first distance from head of the user to ground, a second distance between the camera device 11 and the user when the user is using the electronic device 1. For example, as shown in FIG. 4, when the user is running on a treadmill, the first distance is from the head of the user to the ground. The reasonable value range of the feature data is used to determine whether the user is using the electronic device 1 in a correct way. In at least one embodiment, the setting module 101 can acquire the feature data from the video of the user. The video is recorded by the camera device 11 for a predetermined time duration after the electronic device 1 is activated. For example, the camera device 11 can record the video for the predetermined time duration when the user is running on a treadmill in a correct way, and store the video into the storage device 13. The predetermined time duration can be 10 seconds, 20 seconds, or 30 seconds.

In at least one embodiment, the setting module 101 can obtain the first distance and the second distance every second, and store the first distance and the second distance every second into the storage device 13. And the setting module 101 can calculate an average first distance and an average second distance during the predetermined time duration. When the predetermined time duration is "n" seconds, the average first distance is determined by a first predetermined formula: $H=(H_1+H_2+ \ldots +H_n)/n$, in which the $H_n$ is the first distance in the $n^{th}$ second. The reasonable value range of the first distance can be determined from $H\times(1-a\%)$ to $H\times(1+a\%)$, wherein a % is a first predetermined value (e.g., 5%), as shown in FIG. 4. When the user is running on the treadmill as the right picture of FIG. 4, it can be determined from the left picture of FIG. 4 that the current first distance $H_n$ is less than $H\times(1-a\%)$, so the current first distance is out of the reasonable value range of the first distance, it can be determined that the user could be using the electronic device 11 in a wrong way. When current first distance $H_n$ is within the reasonable value range of the first distance, it can be determined that the user could be using the electronic device 11 in a correct way.

Figure 5:
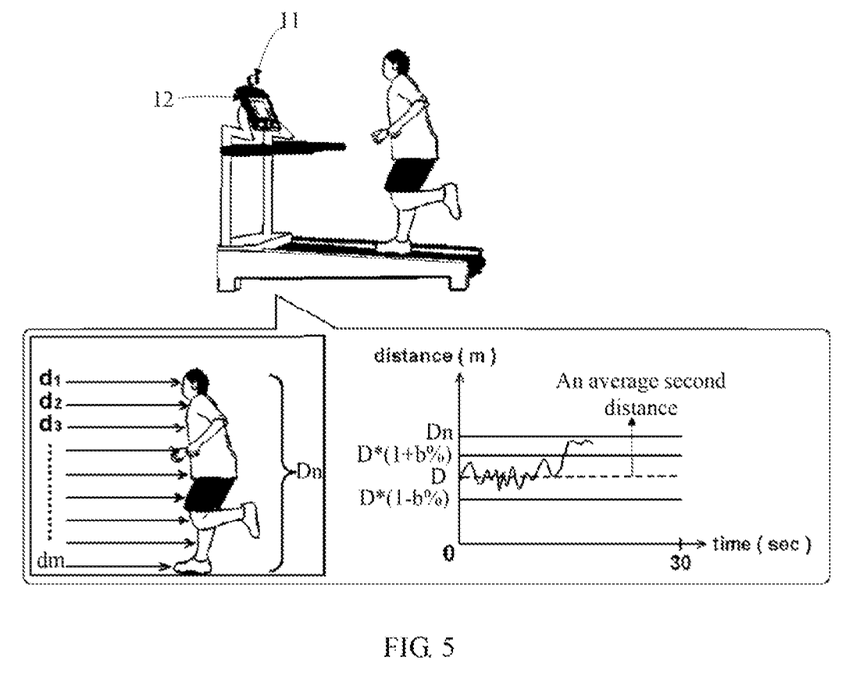
FIG. 5 is a diagrammatic view of an example embodiment of a second distance of feature data of a user.

In at least one embodiment, the average second distance is determined by a second predetermined formula: $D=(D_1+D_2+ \ldots +D_n)/n$, in which $D_n$ is the second distance in the $n^{th}$ second, and the $D_n$ is determined by $(d_n+d_2+ \ldots d_m)/m$, $d_m$ (m is a positive constant) is a range value from the camera device 11 to the body of the user, and $d_m$ is acquired from the camera device 11. The reasonable value range of the second distance can be determined from $D\times(1-b\%)$ to $D\times(1+b\%)$, wherein b % is a second predetermined value (e.g., 50%), as shown in FIG. 5. When the user is running on the treadmill as the right picture of FIG. 5, it can be determined from the left picture of FIG. 5 that the current second distance $D_n$ is more than the $D\times(1+b\%)$, so the current second distance is out of the reasonable value range of the second distance, it can be determined that the user could be using the electronic device 11 in a wrong way. When current second distance $D_n$ is within the reasonable value range of the second distance, it can be determined that the user could be using the electronic device 11 in a correct way.

Figure 6:
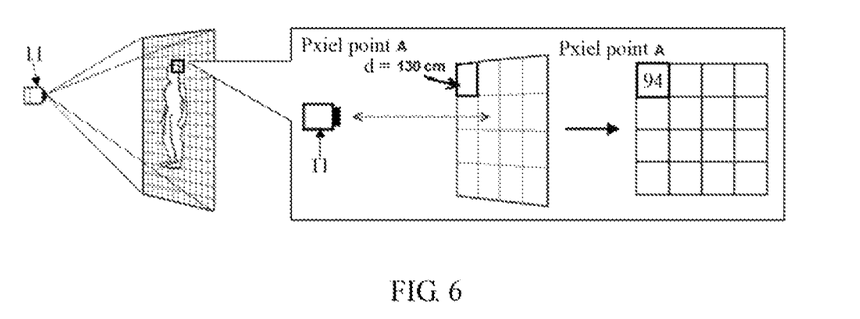
FIG. 6 is a diagrammatic view of an example embodiment of a pixel value of feature data of a user.

In at least one embodiment, when the camera device 11 is recording video of the user, a body size of the user can be displayed on the display device 12 as a figure (e.g., a rectangle). The pixel value of the pixel point of the image is determined by a third predetermined formula: $P_n=(D_n-D_{min})\times P_{max}/(D_{max}-D_{min})$, wherein, the $D_{min}$, the $D_{max}$, and the $P_{max}$ are parameters of the camera device 11. The shortest distance can be measured for the camera device 11 is $D_{min}$, for example, 30 cm. The longest distance can be measured for the camera device 11 is $D_{max}$, for example, 300 cm. The $P_{max}$ is the maximal pixel value of the camera device 11, for example, 255. In one embodiment, as shown in FIG. 6, when the second distance of a pixel point "A" is 130 cm, a pixel value of the pixel point "A" is 94 according to the third predetermined formula. The reasonable value range of each pixel value of each pixel point of the image can be determined from $P_n\times(1-c\%)$ to $P_n\times(1+c\%)$, wherein c % is a third predetermined value (e.g., 2%). For example, when the current pixel value of the pixel point "A" is 90, it can be determined that the current pixel value 90 is out of the reasonable value range.

The acquiring module 102 can acquire current feature data of the user from the camera device 11 every second.

The determination module 103 can determine whether the current feature data is within the reasonable value range of feature data. In at least one embodiment, when the current feature data is within the reasonable value range of the future data, it can be determined that the user could be using the electronic device 1 in a correct way. When the current feature data is out of the reasonable value range of the future data, it can be determined that the user could be using the electronic device 1 incorrectly.

The adjusting module 104 can change a working state of the electronic device 1 when the current feature data is out of the reasonable value range of the future data. In at least one embodiment, when the current feature data is out of the reasonable value range of the future data, the adjusting module 104 can reduce an execution speed of the electronic device 1 or stop the electronic device 1.

In one embodiment, when a current number of the pixel points, which the pixel values of the current number of the pixel points are within the reasonable value range, is more than or equal to a predetermined number (e.g., 1.8 million). It can be determined that the user could be using the electronic device 1 in a correct way. When the current number of the pixel points, which the pixel values of the current number of the pixel points are within the reasonable value range, is less than the predetermined number, it can be determined that the user could be using the electronic device 1 incorrectly. The adjusting module 104 can reduce an execution speed of the electronic device 1 or stop the electronic device 1.

In one embodiment, when the current first distance is out of the reasonable value range of the first distance $\{H\times(1-5\%), H\times(1+5\%)\}$, but within the reasonable value range of the first distance $\{H\times(1-10\%), H\times(1+10\%)\}$, the determination module 103 can determine that the user is adjusting running speed on the electronic device 1. When it is determined that the user is adjusting the running speed on the electronic device 1, the adjusting module 104 can reduce the execution speed of the electronic device 1. When the current first distance is out of the reasonable value range of the first distance $\{H\times(1\times10\%), H\times(1+10\%)\}$, the determination module 103 can determine that the user is the user is getting off the electronic device 1. When it is determined that the user is the user is getting off the electronic device 1, the adjusting module 104 can stop the electronic device 1 to guarantee safety of the user.

In one embodiment, when the current second distance is out of the reasonable value range of the second distance $\{D\times(1-50\%), D\times(1+50\%)\}$, but within the reasonable value range of the second distance $\{D\times(1-60\%), D\times(1+60\%)\}$, the determination module 103 can determine that the user is adjusting running speed on the electronic device 1. When it is determined that the user is adjusting the running speed on the electronic device 1, the adjusting module 104 can reduce the execution speed of the electronic device 1. When the current first distance is out of the reasonable value range of the first distance {D×(1−60%), D×(1+60%)}, the determination module 103 can determine that the user is the user is getting off the electronic device 1. When it is determined that the user is the user is getting off the electronic device 1, the adjusting module 104 can stop the electronic device 1 to guarantee safety of the user.

Figure 7:
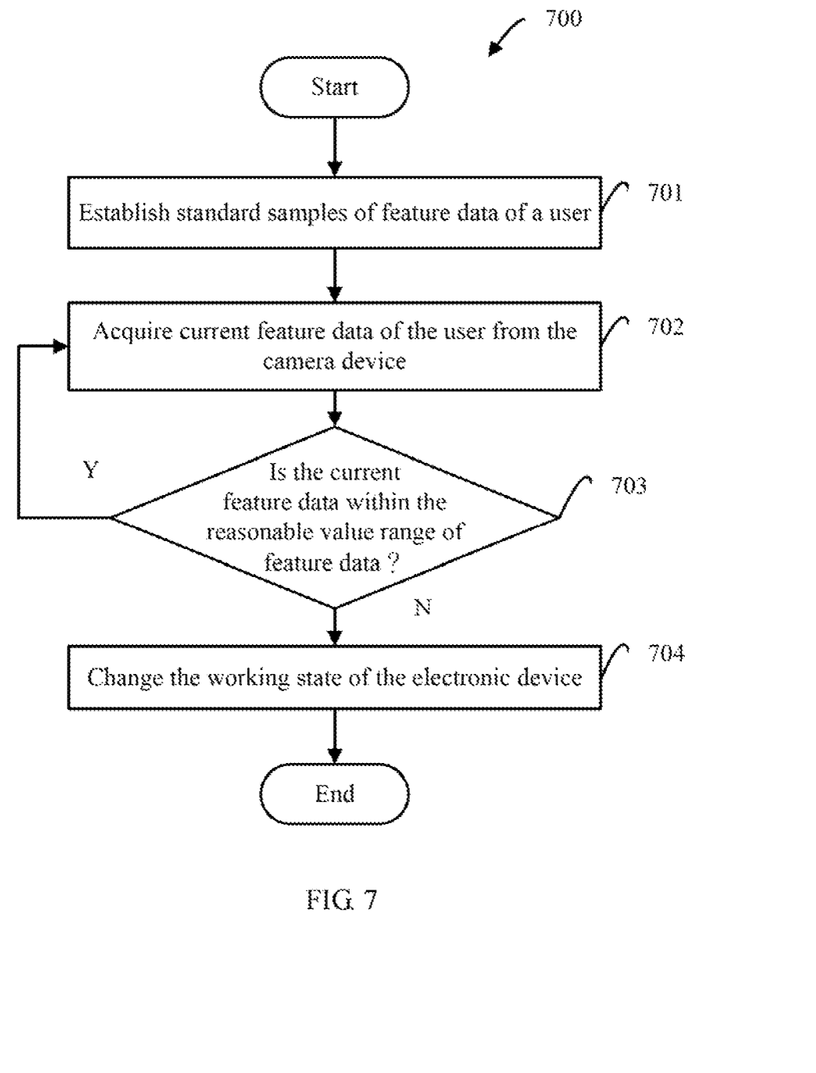
FIG. 7 is a flowchart of an example embodiment of a method for controlling the electronic device.

FIG. 7 illustrates a flowchart is presented in accordance with an example embodiment. An example method 700 is provided by way of example, as there are a variety of ways to carry out the method. The example method 700 described below can be carried out using the configurations illustrated in FIG. 1 and FIG. 3, and various elements of these figures are referenced in explaining the example method. Each block shown in FIG. 7 represents one or more processes, methods, or subroutines, carried out in the example method 700. Furthermore, the illustrated order of blocks is illustrative only and the order of the blocks can be changed according to the present disclosure. The example method 700 can begin at block 701. Depending on the embodiment, additional blocks can be utilized and the ordering of the blocks can be changed.

At block 701, a setting module can set a reasonable value range of feature data of a user. In at least one embodiment, the feature data includes pixel values of pixel points of an image of the user, a first distance from head of the user to ground, a second distance between the camera device 11 and the user when the user is using the electronic device 1. For example, as shown in FIG. 4, when the user is running on a treadmill, the first distance is from the head of the user to the ground. The reasonable value range of the feature data is used to determine whether the user is using the electronic device 1 in a correct way. In at least one embodiment, the setting module 101 can acquire the feature data from a video of the user. The video is recorded by the camera device 11 for a predetermined time duration after the electronic device 1 is activated. For example, the camera device 11 can record the video for the predetermined time duration when the user is running on a treadmill in a correct way, and store the video into the storage device 13. The predetermined time duration includes 10 seconds, 20 seconds, or 30 seconds.

In at least one embodiment, the setting module can obtain the first distance and the second distance every second, and store the first distance and the second distance every second into the storage device 13. And the setting module can calculate an average first distance and an average second distance during the predetermined time duration. When the predetermined time duration is "n" seconds, the average first distance is determined by a first predetermined formula: $H=(H_1+H_2+\ldots+H_n)/n$, in which the $H_n$ is the first distance in the $n^{th}$ second. The reasonable value range of the first distance can be determined from $H\times(1-a\%)$ to $H\times(1+a\%)$, wherein a % is a first predetermined value (e.g., 5%), as shown in FIG. 4. When the user is running on the treadmill as the right picture of FIG. 4, it can be determined from the left picture of FIG. 4 that the current first distance $H_n$ is less than $H\times(1-a\%)$, so the current first distance is out of the reasonable value range of the first distance, it can be determined that the user could be using the electronic device 11 in a wrong way. When current first distance $H_n$ is within the reasonable value range of the first distance, it can be determined that the user could be using the electronic device 11 in a correct way.

In at least one embodiment, the average second distance is determined by a second predetermined formula: $D=(D_1+D_2+\ldots+D_n)/n$, in which $D_n$ is the second distance in the $n^{th}$ second, and the $D_n$ is determined by $(d_1+d_2+\ldots d_m)/m$, $d_m$ (m is a positive constant) is a range value from the camera device 11 to the body of the user, and $d_m$ is acquired from the camera device 11. The reasonable value range of the second distance can be determined from $D\times(1-b\%)$ to $D\times(1+b\%)$, wherein b % is a second predetermined value (e.g., 50%), as shown in FIG. 5. When the user is running on the treadmill as the right picture of FIG. 5, it can be determined from the left picture of FIG. 5 that the current second distance $D_n$ is more than the $D\times(1+b\%)$, so the current second distance is out of the reasonable value range of the second distance, it can be determined that the user could be using the electronic device 11 in a wrong way. When current second distance $D_n$ is within the reasonable value range of the second distance, it can be determined that the user could be using the electronic device 11 in a correct way.

In at least one embodiment, when the camera device 11 is recording video of the user, a body size of the user can be displayed on the display device 12 as a figure (e.g., a rectangle). The pixel value of the pixel point of the image is determined by a third predetermined formula: $P_n=(D_n-D_{min})\times P_{max}/(D_{max}-D_{min})$, wherein, the $D_{min}$, the $D_{max}$, and the $P_{max}$ are parameters of the camera device 11. The shortest distance can be measured for the camera device 11 is $D_{min}$, for example, 30 cm. The longest distance can be measured for the camera device 11 is $D_{max}$, for example, 300 cm. The $P_{max}$ is the maximal pixel value of the camera device 11, for example, 255. In one embodiment, as shown in FIG. 6, when the second distance of a pixel point "A" is 130 cm, the pixel value of the pixel point "A" is 94 according to the third predetermined formula. The reasonable value range of each pixel value of each pixel point of the image can be determined from $P_n\times(1-c\%)$ to $P_n\times(1+c\%)$, wherein c % is a third predetermined value (e.g., 2%). For example, when the current pixel value of the pixel point "A" is 90, it can be determined that the current pixel value 90 is out of the reasonable value range.

At block 702, an acquiring module can acquire current feature data of the user from the camera device 11 every second.

At block 703, a determination module can determine whether the current feature data is within the reasonable value range of feature data. In at least one embodiment, when the current feature data is within the reasonable value range of the future data, it can be determined that the user could be using the electronic device 1 in a correct way, the procedure returns to block 702. When the current feature data is out of the reasonable value range of the future data, it can be determined that the user could be using the electronic device 1 incorrectly, the procedure goes to block 704.

At block 704, an adjusting module can change a working state of the electronic device 1 when the current feature data is out of the reasonable value range of the future data. In at least one embodiment, when the current feature data is out of the reasonable value range of the future data, the adjusting module can reduce an execution speed of the electronic device 1 or stop the electronic device 1.

In one embodiment, when a current number of the pixel points, which the pixel values of the current number of the pixel points are within the reasonable value range, is more than or equal to a predetermined number (e.g., 1.8 million). It can be determined that the user could be using the electronic device 1 in a correct way. When the current number of the pixel points, which the pixel values of the current number of the pixel points are within the reasonable value range, is less than the predetermined number, it can be determined that the user could be using the electronic device 1 incorrectly. The adjusting module can reduce an execution speed of the electronic device 1 or stop the electronic device 1.

In one embodiment, when the current first distance is out of the reasonable value range of the first distance {H×(1−5%), H×(1+5%)}, but within the reasonable value range of the first distance {H×(1−10%), H×(1+10%)}, the determination module 103 can determine that the user is adjusting running speed on the electronic device 1. When it is determined that the user is adjusting the running speed on the electronic device 1, the adjusting module can reduce the execution speed of the electronic device 1. When the current first distance is out of the reasonable value range of the first distance {H×(1−10%), H×(1+10%)}, the determination module can determine that the user is the user is getting off the electronic device 1. When it is determined that the user is the user is getting off the electronic device 1, the adjusting module 104 can stop the electronic device 1 to guarantee safety of the user.

In one embodiment, when the current second distance is out of the reasonable value range of the second distance {D×(1−50%), D×(1+50%)}, but within the reasonable value range of the second distance {D×(1−60%), D×(1+60%)}, the determination module 103 can determine that the user is adjusting running speed on the electronic device 1. When it is determined that the user is adjusting the running speed on the electronic device 1, the adjusting module 104 can reduce the execution speed of the electronic device 1. When the current first distance is out of the reasonable value range of the first distance {D×(1−60%), D×(1+60%)}, the determination module 103 can determine that the user is the user is getting off the electronic device 1. When it is determined that the user is the user is getting off the electronic device 1, the adjusting module 104 can stop the electronic device 1 to guarantee safety of the user.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An electronic device comprising:
   a camera device;
   at least one processor coupled to the camera device;
   a display device coupled to the at least one processor; and
   a storage device storing one or more programs, executable by the at least one processor, to cause the at least one processor to:
   set a reasonable value range of feature data of a user;
   acquire current feature data of the user from the camera device;
   determine whether the current feature data is within the reasonable value range; and
   change a working state of the electronic device when the current feature data is out of the reasonable value range;
   wherein the feature data includes pixel values of pixel points of an image of the user, a first distance from a head of the user to ground, a second distance between the camera device and the user when the user is using the electronic device.

2. The electronic device according to claim 1, wherein the reasonable value range of feature data is set by:
   recording a video of the user for a predetermined time duration by the camera device after the electronic device is activated;
   acquiring the first distance, and the second distance from the camera device every second;
   calculating a pixel value, an average first distance, and an average second distance; and
   setting the reasonable value range of the pixel value, the first distance, and the second distance.

3. The electronic device according to claim 1, wherein the current feature data is determined by comparing the current feature data with the reasonable value range of feature data.

4. The electronic device according to claim 1, wherein the working state of the electronic device is changed by:
   stopping or reducing an execution speed of the electronic device.

* * * * *